Figure 1:
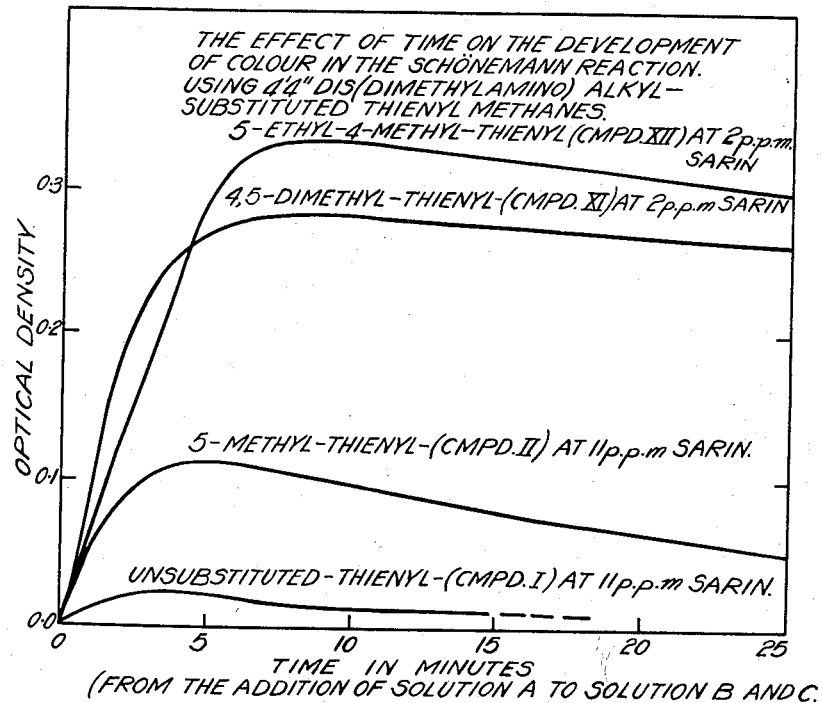

THE EFFECT OF CHLORIDE ION ON THE COLOUR DEVELOPED IN THE SCHÖNEMANN REACTION BY COMPOUND XIV AT pH 1.69

United States Patent Office 2,919,977
Patented Jan. 5, 1960

2,919,977
METHOD FOR TESTING ANTICHOLINESTERASE AGENTS

George A. Grant, Ottawa, Ontario, Canada, assignor to Her Majesty the Queen in the right of Canada as represented by the Minister of National Defence, Ottawa, Ontario, Canada Application January 25, 1957, Serial No. 636,443

Claims priority, application Canada October 1, 1956

7 Claims. (Cl. 23—230)

This invention relates to the preparation and use of certain αα - bis(p - dialkylaminophenyl) - substituted - 2-thienyl-methane compounds and particularly to αα-bis(p-dimethylaminophenyl) - substituted - 2 - thienyl - methane compounds.

Methylisopropylphosphonofluoridate (Sarin), and other compounds known as anticholinesterase agents are known to be violent poisons. In this specification, the term "anticholinesterase agent" is taken to mean compounds having the following structural formulae:

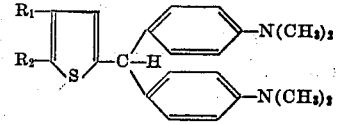

and

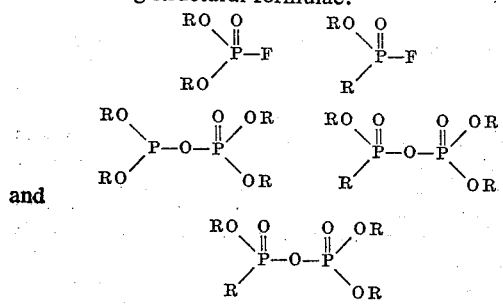

where R is an alkyl group having up to five carbon atoms. Thus the term "anticholinesterase agent" as used in this specification does not include all anticholinesterase agents. Those not included are those containing sulfur and those containing a hydrolyzable cyanide. In the detection of very dilute aqueous solutions of such anticholinesterase agents, use has been made of a reaction known as the Schoenemann reaction, which involved the use of o-dianisidine as the indicator. However, it was found that the colour imparted to the aqueous solution by a positive Schoenemann reaction using o-dianisidine as the indication was only partially suitable. Furthermore, it was found that the sensitivity of the test was low and so field tests of the water involved lengthy periods of evaporation before the concentration of the anticholinesterase agent in the water was high enough for detection.

It is therefore an object of the present invention to disclose an indicator for the Schoenemann reaction which gives a suitable colour reaction.

A further object of the present invention is the disclosure of an indicator for the Schoenemann reaction which is sensitive enough to indicate a positive test when the concentration of the anticholinesterase agent in the water is below the lethal concentration.

These and other objects of the present invention are attained by using, as the indicator in the Schoenemann reaction, a compound of the following structure:

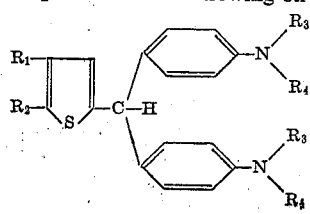

where $R_1$ is an alkyl radical selected from the group consisting of methyl, ethyl, propyl, isopropyl, n-butyl, isobutyl, n-pentyl and isopentyl, $R_2$ is an alkyl radical selected from the group consisting of methyl and ethyl and $R_3=R_4$ and is an alkyl radical selected from the group consisting of methyl, ethyl, n-propyl and isopropyl. More particularly, the objects of the invention are achieved by using, as the indicator in the Schoenemann reaction, a compound of the following structure:

where $R_1$ is an alkyl radical selected from the group consisting of methyl, ethyl, n-propyl, isopropyl, n-butyl, isobutyl, n-pentyl and isopentyl and $R_2$ is an alkyl radical selected from the group consisting of methyl and ethyl.

In other words, the present invention involves the preparation of αα - bis(p - dialkylaminophenyl) - 4,5 - dialkyl-2-thienyl-methane compounds and to their use as indicators in the Schoenemann reaction.

In the course of the preparation of the novel 4,5-dialkyl-2-thienylmethane compounds of the present invention, other similar compounds were also prepared and investigated. However, it was found, surprisingly, that the unsubstituted, monosubstituted, diaromatic substituted or halegeno-alkyl disubstituted thienylmethane compounds were unsatisfactory as indicators in the Schoenemann reaction.

The compounds actually prepared and tested in the Schoenemann reaction were as follows:

(1) α,α-Bis(p-dimethylaminophenyl)-2-thienylmethane
(2) α,α - Bis(p - dimethylaminophenyl) - 5 - methyl - 2-thienylmethane
(3) α,α - Bis(p - dimethylaminophenyl) - 5 - ethyl - 2-thienylmethane
(4) α,α - Bis(p - dimethylaminophenyl) - 5 - propyl - 2-thienylmethane
(5) α,α - Bis(p - dimethylaminophenyl) - 5 - phenyl - 2-thienylmethane
(6) α,α - Bis(p - dimethylaminophenyl) - 5 - chloro - 2-thienylmethane
(7) α,α - Bis(p - dimethylaminophenyl) - 5 - bromo - 2-thienylmethane
(8) α,α - Bis(p - dimethylaminophenyl) - 5 - acetamido-2-thienylmethane
(9) α,α - Bis(p - dimethylaminophenyl) - 3 - methyl - 2-thienylmethane
(10) α,α - Bis(p - dimethylaminophenyl) - 3,4 - dimethyl-2-thienylmethane
(11) α,α - Bis(p dimethylaminophenyl) - 4,5 - dimethyl-2-thienylmethane
(12) α,α - Bis(p - dimethylaminophenyl) - 4 - methyl - 5-ethyl-2-thienylmethane
(13) α,α - Bis(p - dimethylaminophenyl) - 4 - ethyl - 5-methyl-2-thienylmethane
(14) α,α - Bis(p - dimethylaminophenyl) - 4 - methyl - 5-propyl-2-thienylmethane
(15) α,α - Bis(p - dimethylaminophenyl) - 3,4 - diphenyl-2-thienylmethane
(16) α,α - Bis(p - dimenthylaminophenyl) - 4 - methyl-5-bromo-2-thienylmethane In all these cases, the thienylmethane compounds were formed by a series of reactions which were not necessarily analogous for each particular case. However, the last step in the reaction always involved the reaction between the respective unsubstituted or substituted 2-thiophenealdehyde and dimethylaniline. In order to illustrate the preparation of the α,α-bis(p-dialkylaminophenyl)

4,5-dialkyl-2-thienylmethane compounds of the present invention, the preparation of four representative compounds are given.

EXAMPLE I.—PREPARATION OF α,α-BIS(P-DI-METHYLAMINOPHENYL) 4,5-DIMETHYL-2-THIENYL METHANE

The preparation of this compound may be illustrated by the following equations:

(1)
CH₃CH=CHCOOEt + (NaCN, Ba(OH)₂, HNO, NaOH) ⟶
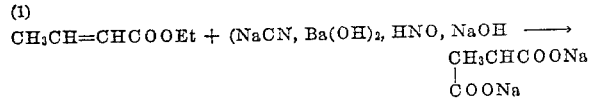

(2) 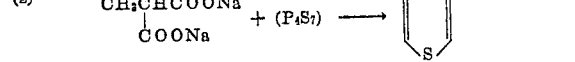

(3) 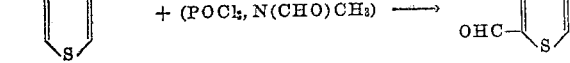

(4) 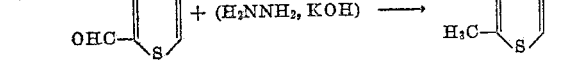

(5) 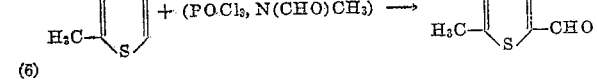

(6) 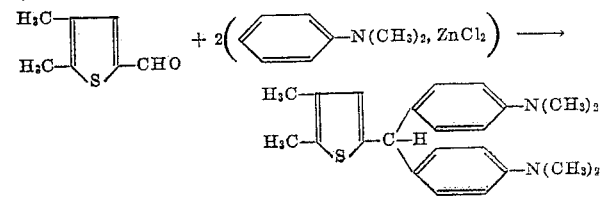

The reaction of step (1) above involved the preparation of pyrotartaric acid from crotonic acid in the following manner, which is a modification of the method in Organic Syntheses, vol. 26, p. 54.

A solution of ethyl crotonate (1.0 mole) 95% ethanol (460 ml.) and sodium cyanide (54 gm. in 128 ml. of water) is refluxed on a steam bath in a fume hood for 5 hr. A suspension of barium hydroxide octahydrate (150 gm. in 286 ml. of hot water) is added and the mixture is concentrated under reduced pressure to a volume of 400 ml. It is refluxed again until the evolution of amonia ceases, and then concentrated under reduced pressure to a thick paste. The residue is dissolved in concentrated nitric acid (171 ml.) of warming for 30 min., and evaporated to dryness under reduced pressure on the steam bath.

The residue is refluxed briefly with 300 ml. of benzene, which is decanted. The cake is then pulverized and extracted six times by refluxing with 300 ml. portions of ether and twice by refluxing with 300 ml. portions of benzene. The combined extracts are then evaporated to about 300 ml. total volume and cooled. The pyrotartaric acid is collected on a filter and washed by shaking with 150 ml. of chloroform. The procedure yields about 70% of the theoretical amount. The monosodium salt of this acid was prepared by dissolving the acid in a minimum amount of hot water, adding the calculated amount of 50% sodium hydroxide solution, and evaporating to dryness.

In this reaction it is found that much time is saved by doing all the evaporations with efficient stirring while heating under reduced pressure.

The reaction of step (2) above involved the preparation of alkyl thiophenes by ring closure, and is a modification of the procedure in Organic Synthesis, Collective Volume II, page 578. In the present case it involved the reaction of the disodium salt of pyrotartaric acid with phosphorus sulfide as follows:

A mixture of the disodium salt of pyrotartaric acid (0.2 mole), sea sand or pumice (40 gm.), and phosphorus heptasulphide (110 gm.) is dry distilled from a 1 litre flask under an oxygen-free nitrogen sweep. The reaction flask is heated gradually to 300° C. or higher. The liquid distillate is collected in an ice-cooled receiver and the gaseous distillate washed by bubbling through ice-cooled ethyl ether in a wash bottle fitted with a fritted glass gas-dispersion disc. Two consecutive runs are made and the products from the condenser, receiver, and wash bottle are transferred to a separatory funnel and washed three times with 10% sodium hydroxide. The ether solution is dried over sodium sulfate and the ether removed by distillation. The product is then distilled at atmospheric pressure. The yields vary greatly depending upon the salt used. Sodium pyrotartrate yields 33–38% of 3-methyl thiophene.

While almost all other workers in the field of thiophene chemistry employ the trisulfide of phosphorus as the sulfur source in this type of reaction, preliminary work by the applicants, in which the three common sulfides of phosphorus (trisulfide, pentasulfide, and heptasulfide) were tried, indicates that only the phosphorus heptasulfide can be used successfully. This apparent anomaly is as yet unexplained.

The reactions indicated in steps (3) and (5) above involve the formulation of substituted thiophenes by the modification, by Weston and Michaels (J. Amer. Chem. Soc. 72, 1422, (1950)), of the procedure of King and Nord (J. Org. Chem. 13, 635, (1948)) for the Vilsmeier reaction. The method used was as follows:

A mixture of N-methyl formanilide (0.2 mole) and phosphorus oxychloride (0.2 mole) is reacted for ½ hour. The substituted thiophene (0.1 mole) is then added and the stirred mixture is allowed to stand for 48 hr. At the end of this time the reaction is quenched with chopped ice and stirred vigorously until the mixture reaches room temperature. The organic layer is extracted with ether and washed with 5% sodium bicarbonate solution until neutral. The ether solution is dried over sodium sulphate and the ether removed by distillation. The residue is then purified by vacuum distillation or crystallization. The yields are 50–90% of theoretical.

The reaction shown by step (4) involved the reduction of carbonyl thiophenes to alkyl thiophenes by the Huang-Minlon modification of the Wolff-Kishner reduction of carbonyl compounds to hydrocarbons, following the procedure of Nord and King. (J. Org. Chem. 14, 638, (1949)). The actual method used was as follows:

The carbonyl thiophene (1 part) is warmed to reflux temperature with an excess of 85% hydrazine hydrate in ethylene glycol (10 parts) and excess hydrazine is distilled off over a period of 10 min. and then the solution is cooled to room temperature before the addition of powdered potassium hydroxide (5 parts). The reaction mixture is heated gradually to the reflux temperature of ethylene glycol and the entire forerun, containing the alkyl thiophene, is collected. The compound is purified by redistillation through a fractionating column. If the alkyl thiophene is a solid or has a boiling point above ethylene glycol, it is precipitated from the reaction mixture by the addition of water and purified by crystallization. The yields in this reaction varied between 60–80%.

The reaction of step (6) involved the preparation of the compounds. The procedure is as follows:

The substituted 2-thiophenealdehyde (0.2 mole) is mixed with dimethylaniline (0.41 mole) and heated on a steam bath while powdered anhydrous zinc chloride (0.3 mole) is gradually added with stirring. Heating is continued for six hours with occasional stirring. Hot water is then added and excess dimethylaniline and aldehyde are removed by steam distillation. The residue is cooled and washed well with water. It is then purified by repeated crystallization from ethanol. Yields are 20–50% of the theoretical amount.

In the case of the 4,5-dimethyl compound prepared in Example I, above, the compound was dissolved in chloroform and filtered through alumina. After evaporating the chloroform, the residue was recrystallized five times from ethanol-water. M.P. 129–132° C.

Analysis:

|  | Calc. | Found |
| --- | --- | --- |
| Percent C | 75.78 | 75.66 |
| Percent H | 7.74 | 7.36 |
| Percent S | 8.79 | 8.44 |

EXAMPLE 2—PREPARATION OF α,α - BIS(P - DIMETHYLAMINOPHENYL) - 4 - METHYL - 5-ETHYL-2-THIENYLMETHANE

The preparation of this compound may be illustrated by the following equations:

(1) and (2): Equations 1 and 2 of Example I.

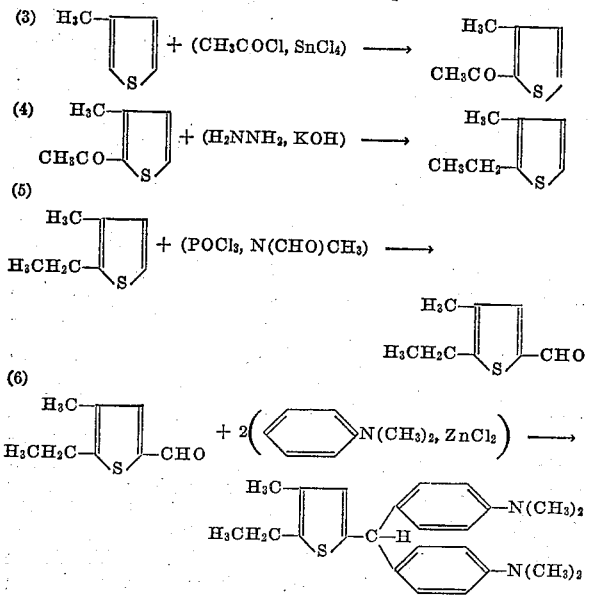

The reaction of steps (1) and (2) above are for the purpose of preparing the 2-methylthiophene starting material, and has been fully described in Example I.

The reaction of step (3) involves the preparation of 2-acetothienone by the acylation of 2-methylthiophene, following the procedure in Organic Synthesis, Collective Volume II, page 8. The procedure is as follows:

Into a 500 ml. three necked flask provided with a thermometer, dropping funnel, a liquid-sealed stirrer and a calcium chloride tube, 0.2 mole of thiophene, 0.2 mole of acetyl chloride and 200 ml. of dry benzene are added. The solution is cooled to 0° C. and 52 gm. of freshly distilled stannic chloride is added dropwise with efficient stirring during the course of about 40 minutes. After all the stannic chloride has been added, the cooling bath is removed and the mixture stirred for one hour longer. The addition product is hydrolyzed by the slow addition of a mixture of 90 ml. of water and 10 ml. of concentrated hydrochloric acid. The yellow benzene layer is separated, washed with 25 ml. of water and dried over 5–10 gm. of anhydrous calcium chloride. Benzene and unchanged thiophene are distilled off through a short fractionating column. The yield of 2-acetothienone, B.P. 89–91/9 mm. is approximately 80%.

The reaction in steps (4), (5) and (6) are the same as those in steps (4), (5) and (6) of Example I, the only difference being that in Example I the substituted thiophene compound is the 4,5-dimethyl, while in Example 2, the substituted thiophene compound is the 4-methyl-5-ethyl. The latter compound was obtained pure after seven recrystallizations from ethanol-water solution. M.P. 129–131° C.

Analysis:

|  | Calc. | Found |
| --- | --- | --- |
| Percent C | 76.14 | 75.61 |
| Percent H | 7.99 | 7.83 |
| Percent S | 8.47 | 8.44 |

EXAMPLE 3—PREPARATION OF α,α - BIS(P - DIMETHYLAMINOPHENYL) - 4 - METHYL-5-PROPYL-2-THIENYLMETHANE

This compound was prepared using the same sequence of steps as in Example 2, except that in step (3), where acetyl chloride was used in Example 2, propionyl chloride was used in Example 3.

The 4-methyl-5-propyl compound, was purified by recrystallization four times from ethanol-water solution. M.P. 104–106° C.

Analysis:

|  | Calc. | Found |
| --- | --- | --- |
| Percent C | 76.48 | 76.47 |
| Percent H | 8.22 | 8.33 |
| Percent S | 8.17 | 8.40 |

It can readily be seen that the above identified procedures may readily be adapted to prepare the other 4,5-dialkyl-2-thienylmethane compounds of the present invention.

In order to determine the effectiveness of the leuco compounds prepared by the present invention as indicators in the Schoenemann reaction, the following procedures were used. It is noted that the reagents in procedure X were in solution form, while those in procedure Y were in pill form.

*Procedure X.*—Firstly, three solutions were prepared. Solution A consisted of a 0.05% solution of the thienylmethane compound in 1:16 (by volume) of hydrochloric acid. Solution B consisted of a 4.0% aqueous solution of sodium pyrophosphate peroxide (Becco brand). Solution C consisted of an aqueous solution of methylisopropylphosphonofluoridate (Sarin), the anticholinesterase agent. This solution is hereinafter termed the "test" solution. The amount was usually in the range of 5–10 p.p.m. and was determined by the following procedure, using dianisidine-peroxide:

Ten ml. of the water to be tested for "nerve gas" was placed in a test tube and one ml. of an indicator solution, prepared by dissolving 0.1 gm. of dianisidine hydrochloride and 2 gm. of sodium benzene sulfonate in 100 ml. of distilled water, and one ml. of an oxidizing solution prepared by dissolving 4 gm. of sodium pyrophosphate peroxide in 100 ml. of distilled water were added. The colour was allowed to develop for 15 to 20 minutes. The solutions were transferred to an absorption cell with a 2 cm. light path, and the colour intensity was measured against a blank solution in a Beckman spectrophotometer employing a radiation wave length of 450 mμ.

The actual procedure of the present invention involved adding one ml. of peroxide solution B to 10 ml. of "test" solution C and mixing them immediately. As soon as possible (within 30 sec.) 1 ml. of indicator solution A was added to the mixture of solutions B and C. The same procedure was followed in making the blank, except that 10 ml. of distilled water was used in place of the 10 ml. of solution C. The "test" solution and the blank solution were each put in cylindrical Corex cells of 2 cm. path length. Optical density readings were taken at the wave length of the absorption maximum using a Beckman Model DU spectrophotometer, seven minutes after the addition of solution A to solutions B and C. The values so obtained were equated to 5 p.p.m. using Beer's law.

The optical density readings are given below, in Table I.

*Table I*

OPTICAL DENSITIES AT THE ABSORPTION MAXIMUM OF THE COLOR DEVELOPED IN THE SCHOENEMANN REACTION BY THIENYLMETHANE COMPOUNDS

| Compound<br>α,α-bis(dimethylaminophenyl) substituted-2-thienylmethane, when the substitution is as follows— | Wavelength at Absorption Maximum, m. | Optical Density |
|---|---|---|
| I. Unsubstituted | 620 | 0.010 |
| II. 5-methyl | 620 | 0.050 |
| III. 5-ethyl | 620 | 0.051 |
| IV. 5-propyl | 620 | 0.053 |
| V. 5-phenyl | 640 | 0.010 |
| VI. 5-chloro | 620 | 0.010 |
| VII. 5-bromo | 480 | 0.020 |
| IX. 3-methyl | 610 | 0.003 |
| X. 3,4-dimethyl | 610 | 0.012 |
| XI. 4,5-dimethyl | 610 | 0.597 |
| XII. 5-ethyl-4-methyl | 600 | 0.782 |
| XIII. 4-ethyl-5-methyl | 600 | 0.495 |
| XIV. 5-propyl-4-methyl | 610 | 0.846 |
| XV. 3,4-diphenyl | 620 | 0.062 |
| XVI. 5-bromo-4-methyl | 600 | 0.025 |

It is seen from the above table that compounds XI, XII, XIII and XIV, representative of the compounds of the present invention, are unexpectedly much better in the detection of anticholinesterase agents in water. The optical density is of the order of several hundred times greater than that of the other triaryl methane compounds.

*Procedure Y.*—In this procedure, pill No. 1 consisted of the acid portion of solution A, pill No. 2 consisted of the thienylmethane compound portion of solution A, and pill No. 3 consisted of the active compound of solution B. The actual composition of the pills is given below in Table II:

*Table II*

COMPOSITION OF PILLS

| | Constituents |
|---|---|
| Pill No. 1 | 0.15 gm. powdered rock KHSO₄. |
| Pill No. 2. With thienylmethane compound XI | 0.002 gm. cmpd. XI.<br>0.292 gm. NaCl.<br>0.036 gm. NaHCO₃. |
| | 0.330 gm. |
| Pill No. 2. With thienylmethane compound XII | 0.002 gm. cmpd. XII.<br>0.218 gm. NaCl.<br>0.030 gm. NaHCO₃. |
| | 0.250 gm. |
| Pill No. 3 | 0.05 gm. sodium pyrophosphate peroxide.<br>0.05 gm. NaCl. |
| | 0.10 gm. |

In the actual operating procedure, pills 1 and 2 were dissolved in 2 ml. of water, while pill 3 was dissolved in 10 ml. of "test" solution C. For the blank, distilled water was substituted for solution C. The 2 ml. of solution containing pills 1 and 2 was then added to solution C containing pill 3, and development of the color was determined as previously described for Procedure X. The results compared favourably with the results obtained using Procedure X.

It was found that a number of factors affect the colour development in the Schoenemann reaction when the triarylthienylmethane compounds of the present invention are employed as indicators. Among the factors studied were reaction time, pH, chloride ion and peroxide concentrations, stability of the perphosphonate ion and order of addition of the test reagents.

The effect of time on the colour development in the Schoenemann reaction was determined on those compounds designated as I, II, XI, and XII of Table I. (In the specification, when a compound is designated by a Roman numeral, it is intended to refer to the compound of the same Roman numeral designation in Table I.) The results are plotted on the graph shown in Fig. 1 which illustrate the effect of time on the colour developed in the Schoenemann reaction at the absorption maximum of 610 mμ. It is seen that, with a concentration of the test solution of 2 p.p.m. of the anticholinesterase agent, the compounds of the present invention give an optical density of about 0.3, whereas the thienylmethane compounds outside the scope of the invention give an optical density of about 0.1 at a concentration of anticholinesterase agent of 11 p.p.m. In other words, the thienylmethane compounds of the present invention are about 17 times as sensitive as those outside the scope of the invention.

Figure 2:
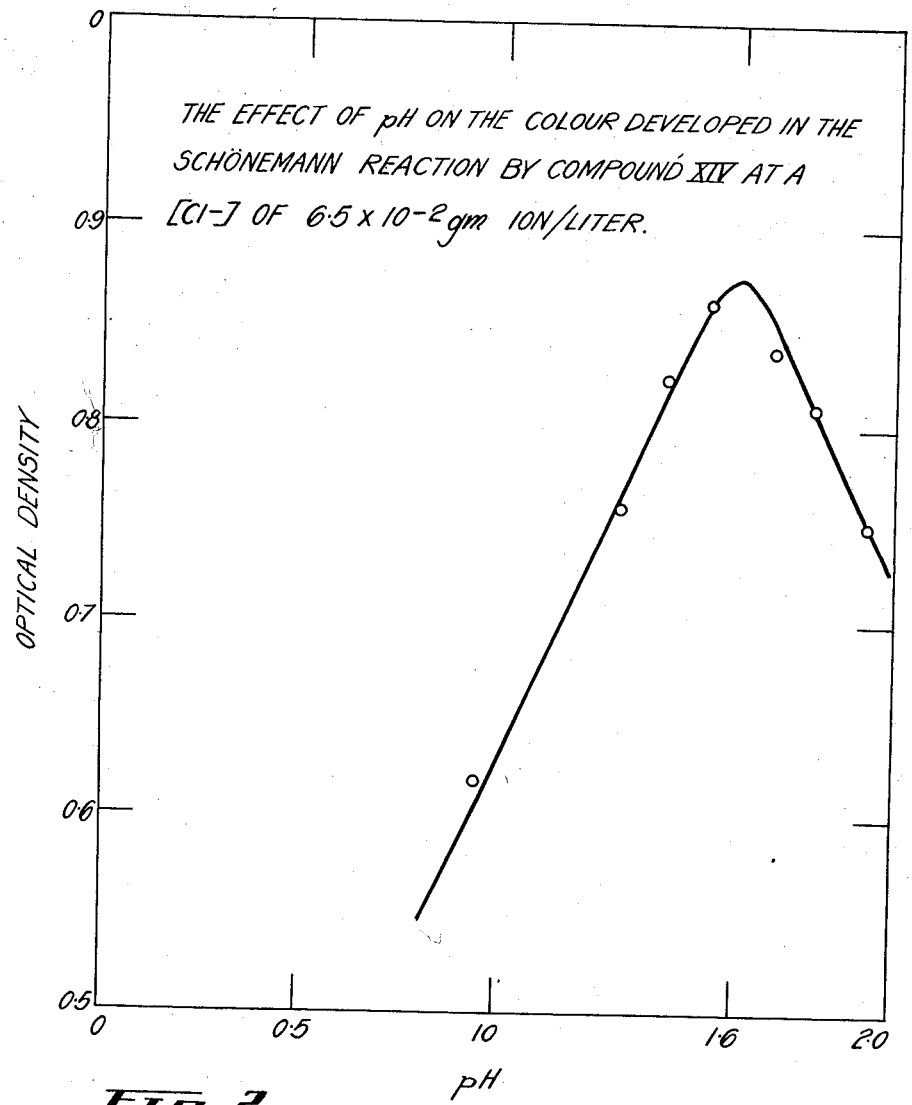

It was also discovered that the effect of pH on the colour development was critical. In determining the pH at which the optimum color was produced, compound XIV was dissolved in various concentrations of sulfuric acid, each solution containing $6.5 \times 10^{-2}$ mole per liter of sodium chloride. The optical density was determined at 610 mμ, and the pH of each test solution determined. The results are recorded graphically in Fig. 2. It is evident from Fig. 2 that there is a sharp decrease in colour intensities at pH values above and below about pH 1.6. Hence, optimum results in the Schoenemann reaction using the compounds of the present invention as indications, are achieved if the pH of the solution is dropped from pH 8 or 9 to pH 1.6±0.1. This results in a maximum colour and hence the greatest sensitivity in the test. However, the test will be operative up to a pH of 2.1 at higher or lower chloride ion concentrations. It is merely necessary to operate at such pH conditions as are necessary to solubilize the compound.

The presence of chloride ion in the solution was found to be essential for the achievement of the test results. It was found that, in the complete absence of chloride ion, as when either potassium bisulfate-sulfate buffer or sulfuric acid alonse was used to control the pH, no colour was formed. In the tests, various quantities of potassium chloride were added to the "test" solution (solution C) and solution A was made up either with sulfuric acid or hydrochloric acid to give solutions of known chloride ion concentration and pH values. This gave information on the interacting effects of chloride ion and pH on colour development.

*Table III*

THE EFFECT OF pH AND CHLORIDE ION CONCENTRATION ON THE COLOR DEVELOPED IN THE SCHOENEMANN REACTION

| Concentration of Chloride Ion in gm. ions per 12 ml. Sample | Optical Density With 2.0 p.p.m. Sarin | pH |
|---|---|---|
| 0.0 | 0.007 | 1.23 |
| 0.0 | 0.002 | 1.76 |
| 0.0 | 0.022 | 1.90 |
| 0.75 | 0.347 | 1.70 |
| 0.75 | 0.356 | 1.60 |
| 6.7 | 0.416 | 1.75 |
| 7.5 | 0.208 | 1.82 |
| 8.2 | 2.243 | 1.75 |
| 12.3 | 0.330 | 1.44 |
| 13.4 | 0.338 | 1.60 |
| 13.4 | 0.418 | 1.65 |
| 13.4 | 0.382 | 1.73 |
| 13.4 | 0.365 | 1.83 |
| 13.4 | 0.365 | 1.92 |
| 13.4 | 0.338 | 2.28 |
| 14.2 | 0.422 | 1.67 |
| 16.3 | 0.236 | 1.60 |
| 26.8 | 0.397 | 1.61 |
| 26.8 | 0.397 | 1.83 |
| 27.6 | 0.414 | 1.56 |
| 32.6 | 0.203 | 1.79 |
| 53.6 | 0.289 | 1.60 |
| 67.8 | 0.335 | 1.61 |

It is seen that the chloride ion influences the intensity of the colour formed, and that a pH of about 1.65 is about the optimum condition for maximum colour development.

Figure 3:
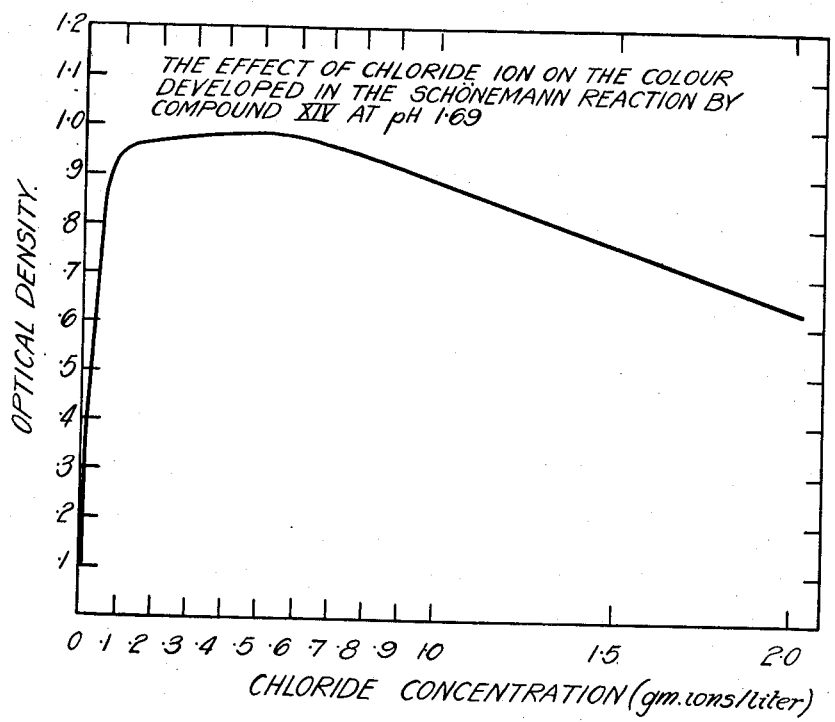

The experiments were then repeated controlling the pH at 1.69 and varying the chloride ion concentration. In order to determine the concentration of chloride ion which produces the optimum colour at pH 1.69, compound XIV was dissolved in 1.50 sulfuric acid and the amount of sodium chloride varied. These solutions were used in place of solution A in the Schoenemann reaction according to the procedure previously outlined. In order that the work could be duplicated, it was necessary to add the reagents at definite intervals and to employ a mechanical stirrer to ensure uniform mixing of the solutions. In this particular instance, the time interval between additions was 30 seconds and a magnetic stirrer provided uniform agitation. The time required to attain maximum optical density varied between 3 and 21 minutes when the chloride ion concentration was varied between $10^{-3}$ and 3 gm. ion/liter. The results of this study are illustrated graphically in Fig. 3. It is evident from the graph that, at a concentration of chloride ion of $5 \times 10^{-1}$ gm. ion/liter, the solution produces maximum colour intensity. It is also evident that the concentration of chlorine ions is critical.

It was also determined that chlorine as hypochlorite gives a false test for the anticholinesterase agents in the Schoenemann reaction, and that cyanide ion interferes in the Schoenemann reaction by blocking the formation of the dye formed from the thienylmethane compounds of the present invention.

In the case of hypochlorite, it was found that, if a time interval of 3 minutes is allowed to elapse between the addition of the aqueous anticholinesterase agent solution and the compound, the false test for hypochlorite no longer occurs, and that the test for the anticholinesterase agent was accurate. Hence the Schoenemann reaction is preferably performed according to the present invention in two stages; firstly, containing the compound of the present invention reagent is added to a "test" solution in the absence of peroxide, and if a colour is formed, free chlorine is present; secondly, if a colour is formed at the first stage, the regular test method is applied to a new test solution, with an interval of 3 minutes elapsing before the compound of the present invention is added. If a colour is formed, this indicates that an anticholinesterase agent is also present in the test solution. If the test for free chlorine is negative, the test may be done as originally specified.

Figure 4:
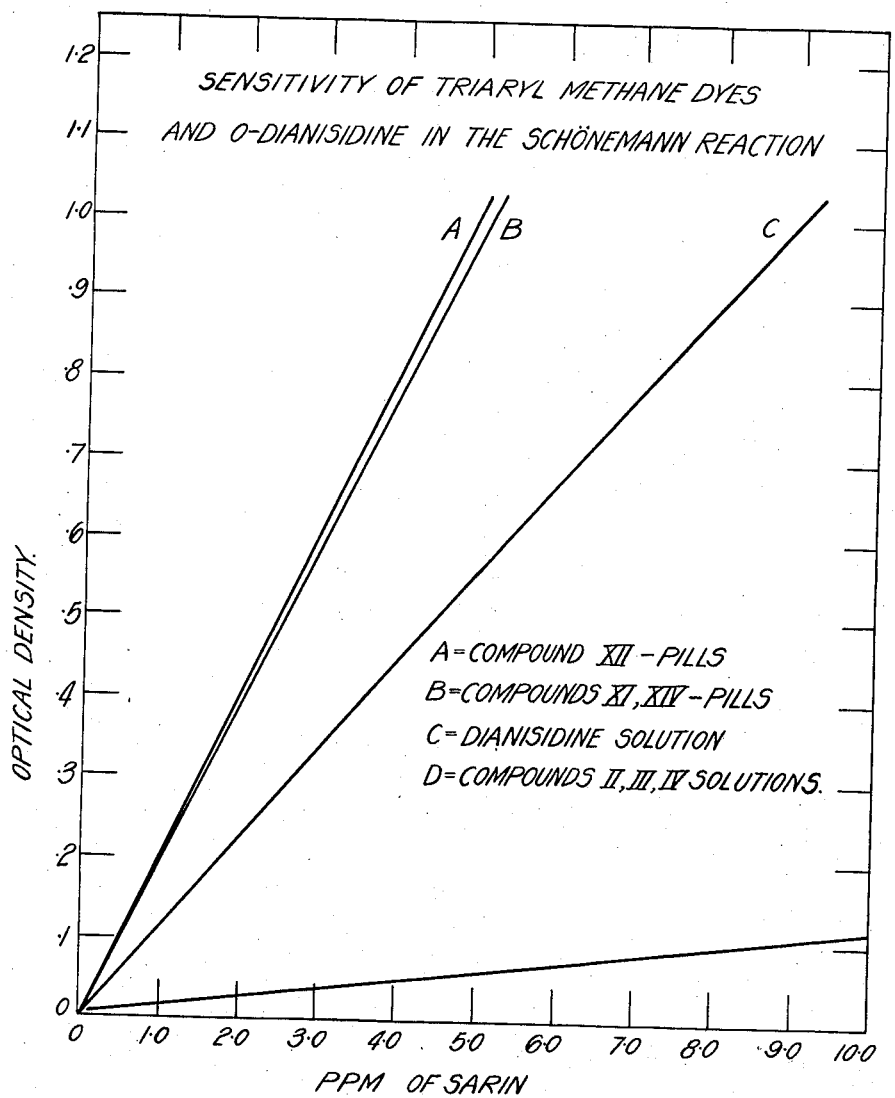

The sensitivity of the test according to the present invention was also determined, the anticholinesterase agent being methylisopropylphosphonofluoridate (Sarin). The test was performed using the pH and chloride ion concentrations conducive to optimum colour intensity as determined previously. Pilled reagents were used according to the procedure previously outlined. A magnetic stirrer was used to ensure uniform mixing, and a stopwatch was used to measure thirty second intervals between the addition of solutions A and C. Compounds II, III, IV, XI, XII and XIV were tested in this way using various concentrations of the aqueous Sarin. At the same time, tests were also run on the same solutions using o-dianisidine as the indicator. The results are plotted in Fig. 4. An examination of Fig. 4 reveals that compounds XI, XII and XIV give more intense colour than o-dianisidine which in turn give much more intense colour than compounds II, III and IV. It is thus seen that at a concentration of 1.0 p.p.m. of aqueous anticholinesterase agent the optical density using the compounds of the present invention is 0.2, which is perceptible, whereas, using o-dianisidine the optical density is 0.1, which in general is not perceptible.

It should be noted that the correct order of addition of reagents must occur for the test to be operative. Thus, if the acid solution containing the compounds of the present invention are added prior to the sodium pyroperoxide, no colour reaction will take place.

What I claim is:

1. In the method for testing for the presence of anticholinesterase agents in water using the Schoenemann reaction, the improvement which comprises using, as the indicator in such reaction, a compound selected from the group of compounds having the formulae

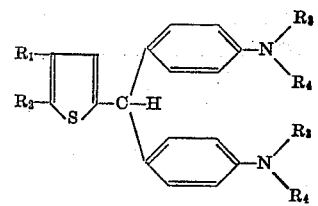

wherein $R_1$ is an alkyl radical selected from the group consisting of methyl, ethyl, n-propyl, isopropyl, n-butyl, isobutyl, n-pentyl and isopentyl, $R_2$ is an alkyl radical selected from the group consisting of methyl and ethyl, and $R_3 = R_4$ and is an alkyl radical selected from the group consisting of methyl, ethyl, n-propyl and isopropyl.

2. In the method for testing for the presence of anticholinesterase agents in water using the Schoenemann reaction, the improvement which comprises using, as the indicator, a compound having the structure

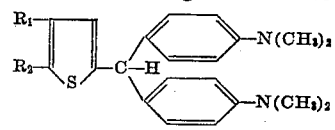

wherein $R_1$ is an alkyl radical selected from the group consisting of methyl, ethyl, n-propyl, isopropyl, n-butyl, isobutyl, n-pentyl and isopentyl and $R_2$ is an alkyl radical selected from the group consisting of methyl and ethyl.

3. In a method of testing for the presence of anticholinesterase agents in water using the Schoenemann reaction the steps which include maintaining the pH of the solution at 1.5–1.7, maintaining a chloride ion concentration of $5 \times 10^{-2}$–1 gm. ions/liter and using α,α-bis-(p-dimethylaminophenyl)-4,5-dimethyl-2-thienylmethane as the indicator.

4. In a method of testing for the presence of anticholinesterase agents in water using the Schoenemann reaction the steps which include maintaining the pH of the solution at 1.5–1.7, maintaining a chloride ion concentration of $5 \times 10^{-2}$–1 gm. ions/liter and using α,α-bis(p-dimethylaminophenyl) - 4-methyl-5-ethyl-2-thienylmethane as the indicator.

5. In a method of testing for the presence of anticholinesterase agents in water using the Schoenemann reaction the steps which include maintaining the pH of the solution at 1.5–1.7, maintaining a chloride ion concentration of $5 \times 10^{-2}$–1 gm. ions/liter and using α,α-bis(p-dimethylaminophenyl) - 4-ethyl-5-methyl-2-thienylmethane as the indicator.

6. In a method of testing for the presence of anticholinesterase agents in water using the Schoenemann reaction the steps which include maintaining the pH of the solution of 1.5–1.7, maintaining a chloride ion concentration of $5 \times 10^{-2}$–1 gm. ions/liter and using α,α-bis(p-dimethylaminophenyl) - 4-methyl-5-propyl-2-thienylmethane as the indicator.

7. In the method of testing for the presence of anticholinesterase agents in water in the presence of hypochlorite, the improvement which includes the step of using, as the indicator, a compound selected from the group consisting of those having the formulae

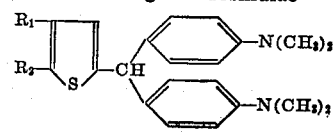

wherein $R_1$ is an alkyl radical selected from the group consisting of methyl, ethyl, n-propyl, isopropyl, n-butyl, isobutyl, n-pentyl, and isopentyl and $R_2$ is an alkyl radical selected from the group consisting of methyl and ethyl, and also the step of allowing an interval of about three minutes to elapse between the addition of the material under test and the said indicator.

References Cited in the file of this patent

UNITED STATES PATENTS

| | | |
|---|---|---|
| 2,480,450 | Cocroft et al. | Aug. 30, 1949 |
| 2,553,785 | Pines et al. | May 22, 1951 |
| 2,617,715 | Haller | Nov. 11, 1952 |
| 2,645,563 | Jensen | July 14, 1953 |

OTHER REFERENCES

Hartough: Thiophene and its Derivatives, Interscience Publishers, Inc. N.Y. (1952), pages 315–317.

Steinkopf et al.: Justus Liebig's Annalen der Chemie, vol. 541; pages 260–282 (pages 281 and 282 relied on), 1939.

Peter: Deutsche Chemische Gesellschaft (Berichte), vol. 18; pages 537–542 (page 542 relied on), (1885).